United States Patent
Dong et al.

(10) Patent No.: US 7,590,820 B2
(45) Date of Patent: Sep. 15, 2009

(54) EFFICIENT ALGORITHM FOR MULTIPLE PAGE SIZE SUPPORT IN IPF LONG FORMAT VHPT

(75) Inventors: Yaozu Dong, Shanghai (CN); Arun Sharma, Union City, CA (US); Xiaoyan Feng, Shanghai (CN); Rohit Seth, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 11/220,695

(22) Filed: Sep. 8, 2005

(65) Prior Publication Data

US 2007/0055844 A1    Mar. 8, 2007

(51) Int. Cl.
G06F 9/34 (2006.01)
G06F 9/36 (2006.01)

(52) U.S. Cl. .................................. 711/209; 711/207

(58) Field of Classification Search .................. None
See application file for complete search history.

(56) References Cited

U.S. PATENT DOCUMENTS 6,012,132 A * 1/2000 Yamada et al. .............. 711/207

2007/0043929 A1 * 2/2007 Safford et al. ............... 711/207

OTHER PUBLICATIONS

Intel Itanium Archtecture Software Developer's Manual, vol. 2, rev 2.1 Oct. 2002, section 4.1, section 5.3.*

* cited by examiner

Primary Examiner—Hyung S Sough
Assistant Examiner—Duc T Doan
(74) Attorney, Agent, or Firm—Venable LLP; James R. Burdett; Jeffri A. Kaminski

(57) ABSTRACT

A machine-accessible medium may contain program instructions that, when executed by a processor, may cause the processor to perform at least one operation including searching a virtual hash page table (VHPT) using a region identifier and a virtual page number of a virtual address, and a default page size corresponding to the region identifier to locate a virtual address translation in the VHPT. The operation performed may further include searching the VHPT using the region identifier, the virtual page number, and at least one utilized page size to locate a virtual address translation in the VHPT if a virtual address translation is not located during the search of the VHPT using the region identifier, virtual page number, and default page size. The operation performed may also include inserting the located virtual address translation into a translation cache once a virtual address translation is located.

22 Claims, 5 Drawing Sheets

EFFICIENT ALGORITHM FOR MULTIPLE PAGE SIZE SUPPORT IN IPF LONG FORMAT VHPT

BACKGROUND OF THE INVENTION

A virtual hash page table (VHPT) may provide a mapping of physical to virtual addresses. VHPTs may not be infinitely large because as the size of the VHPT increases, overhead required for accessing entries within the VHPT also increases. Additionally, because VHPTs may be smaller than virtual address spaces, two unrelated virtual addresses may be accessed by the same key, resulting in a collision.

Processor architectures may support several hardware features that may allow an operating system (OS) implementer or virtual machine a wide range of flexibility in implementing OS policies. For example, processor architectures may support a large number of page sizes (e.g., 4 KB to 4 GB) and/or multiple page table formats, which may include, e.g., short format virtually-mapped linear page tables and long format VHPTs.

BRIEF DESCRIPTION OF THE DRAWINGS

Exemplary embodiments of the invention will now be described in connection with the associated drawings, in which.

DETAILED DESCRIPTION OF VARIOUS EMBODIMENTS

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Figure 1:
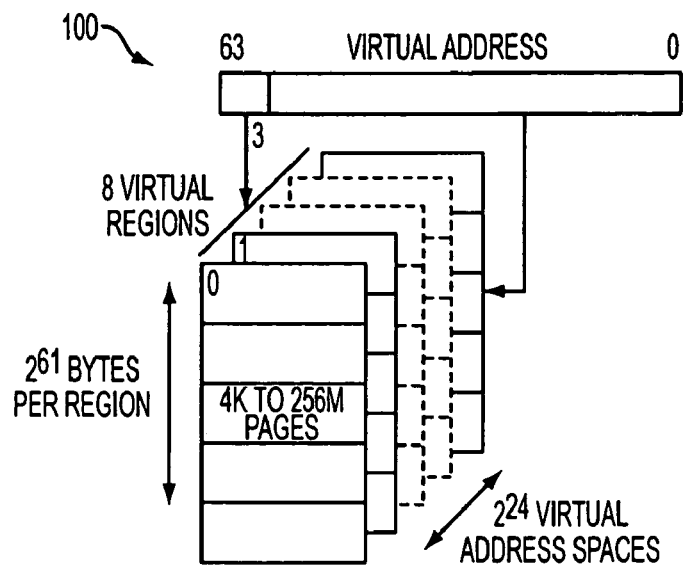
FIG. 1 depicts an exemplary embodiment of a virtual address space.

FIG. 1 depicts an exemplary embodiment of a virtual address space 100 according to some embodiments of the present invention. As is shown in FIG. 1, virtual address space 100 may be divided into, for example, eight $2^{61}$-byte virtual regions. In such an embodiment, the region may be selected by, for example, the upper 3-bits of the virtual address (although embodiments of the invention are not limited to this). Further, a region register that may specify a region identifier (e.g., a unique address space number) for the region may be associated with each virtual region. In an exemplary implementation shown in FIG. 1, for example, this region identifier may contain 24-bits, however, the invention is not limited to this implementation. Hence, for this exemplary implementation, eight out of the possible $2^{24}$ virtual address spaces as shown in FIG. 1 may be concurrently accessible via eight region registers.

As is shown in FIG. 1, each of the regions may include one or more pages having a size of, for example, but not limited to 4K to 256 MB. In an exemplary embodiment of the invention, default page sizes and translation policies may be assigned to each virtual region, for example.

Figure 2:
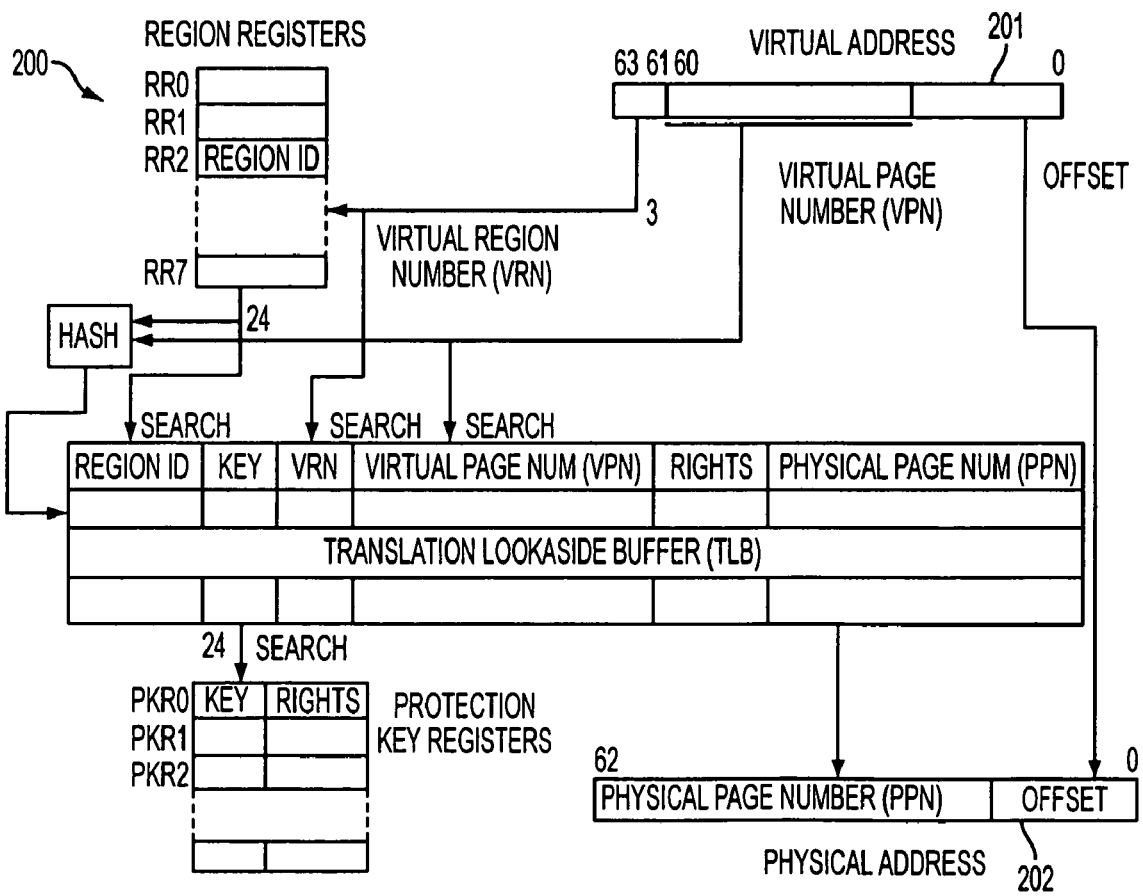
FIG. 2 depicts an exemplary embodiment of a process for mapping a virtual address into a physical address.

FIG. 2 depicts an exemplary embodiment of a process 200 for mapping a virtual address 201 into a physical address 202. In exemplary embodiments, virtual address 201 may support a short format virtually-mapped linear page table, as may be shown for example, in FIG. 2, or long format VHPTs (as may be shown FIG. 3 below).

As is shown in FIG. 2, each virtual address 201 may be composed of, for example, three fields, which may include: a virtual region number (VRN), a virtual page number (VPN) and the page offset. In an exemplary implementation of an embodiment of the invention, the upper 3-bits may select the VRN; the least-significant bits may form the page offset; and the VPN may consist of the remaining bits. In such an embodiment, the VRN bits may not be included in the VPN. Further, the page offset bits may be passed through the translation process unmodified, and exact bit positions for the page offset and VPN bits may vary depending on the page size used in the virtual mapping, for example.

In an exemplary embodiment of the invention, a memory reference may refer to a reference other than an insert or a purge, for example. During a memory reference, the VRN bits may select a region identifier (RID) from one of the eight region registers rr0-rr7, in the exemplary implementation shown in FIG. 2. The translation lookaside buffer (TLB) may then be searched for a matching translation during memory references. If a matching translation is found, the entry's physical page number (PPN) may be concatenated with the page offset bits to form the physical address 202, for example.

In such an embodiment, if the required translation is not resident in the TLB, for example, a processor (not shown) may optionally search the VHPT structure that may be located in memory for the required translation and may install the entry into the TLB.

In an exemplary embodiment of the invention, the VHPT may be an extension of the TLB hierarchy and may enhance virtual address performance. In such an embodiment, a processor may include a VHPT walker (not shown) that may be configured to search the VHPT for a translation after a failed instruction or data TLB search. In such an embodiment, the VHPT may reside in virtual memory space and may be configurable as a primary page table of the operating system or as a single large translation cache in memory, for example.

Figure 3:
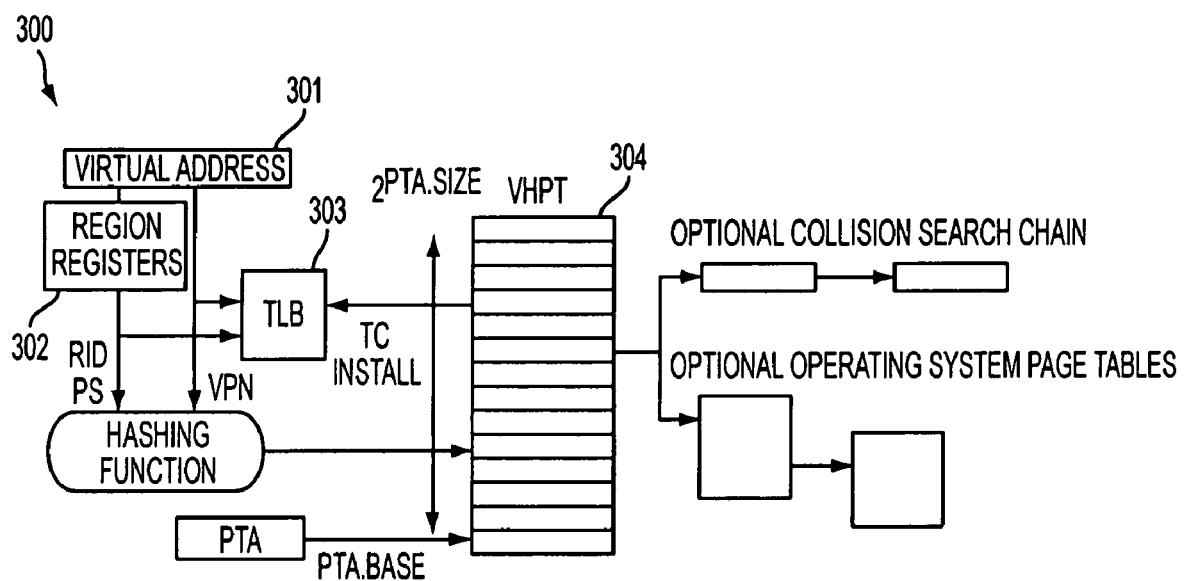
FIG. 3 depicts an exemplary embodiment of a virtual hash page table structure.

FIG. 3 depicts an exemplary embodiment of a VHPT structure 300 for translation of a virtual address 301. In such an embodiment, during a memory reference, a region identifier (RID) may be selected from a region register 302. The translation lookaside buffer 303 may then be searched for a matching translation. If the required translation is not resident in the translation lookaside buffer 303, for example, a processor (not shown) may optionally search the VHPT 304, which may be located in memory for the required translation, and may install the entry into the translation lookaside buffer 303. In an exemplary embodiment of the invention, VHPT 304 may be a single contiguous hash table. In such an embodiment, a hashing function may, for example, be used to search VHPT 304. Accordingly, a VHPT walker (not shown) may use virtual address 301, the RID, and the region's default page size (PS), which in some embodiments may be supplied by a region register 302 (however, the invention is not thus limited), to compute a hash index into VHPT 304. In alternative embodiments, the hash function may be implementation specific. If the required translation cannot be found in either the translation lookaside buffer 303 or the VHPT 304, for example, the processor may raise a TLB miss fault to request that the operating system, for example, supply the translation.

In an exemplary embodiment of the invention, as discussed above with respect to FIG. 1, a range of page sizes may be supported to provide flexibility in implementing operating system policies. In such an exemplary embodiment, to access pages of varying size within the VHPT, an auxiliary data structure may be used to map a region identifier, for example, to a bitmap containing page sizes used with that region identifier. For example, a 64-bit integer may be sufficient to cover all possible page sizes; however, in alternative exemplary embodiments, varying sizes of integers, as well as other data types, including, but not limited to, floating-point numbers and character strings, may be used. Further, in such an embodiment, when a TLB insert is made with a page size that is greater than the default page size, for example, the page size may be stored such that, at a TLB miss time, only those pages that have actually been used with the given region identifier may be searched.

Figure 3A:
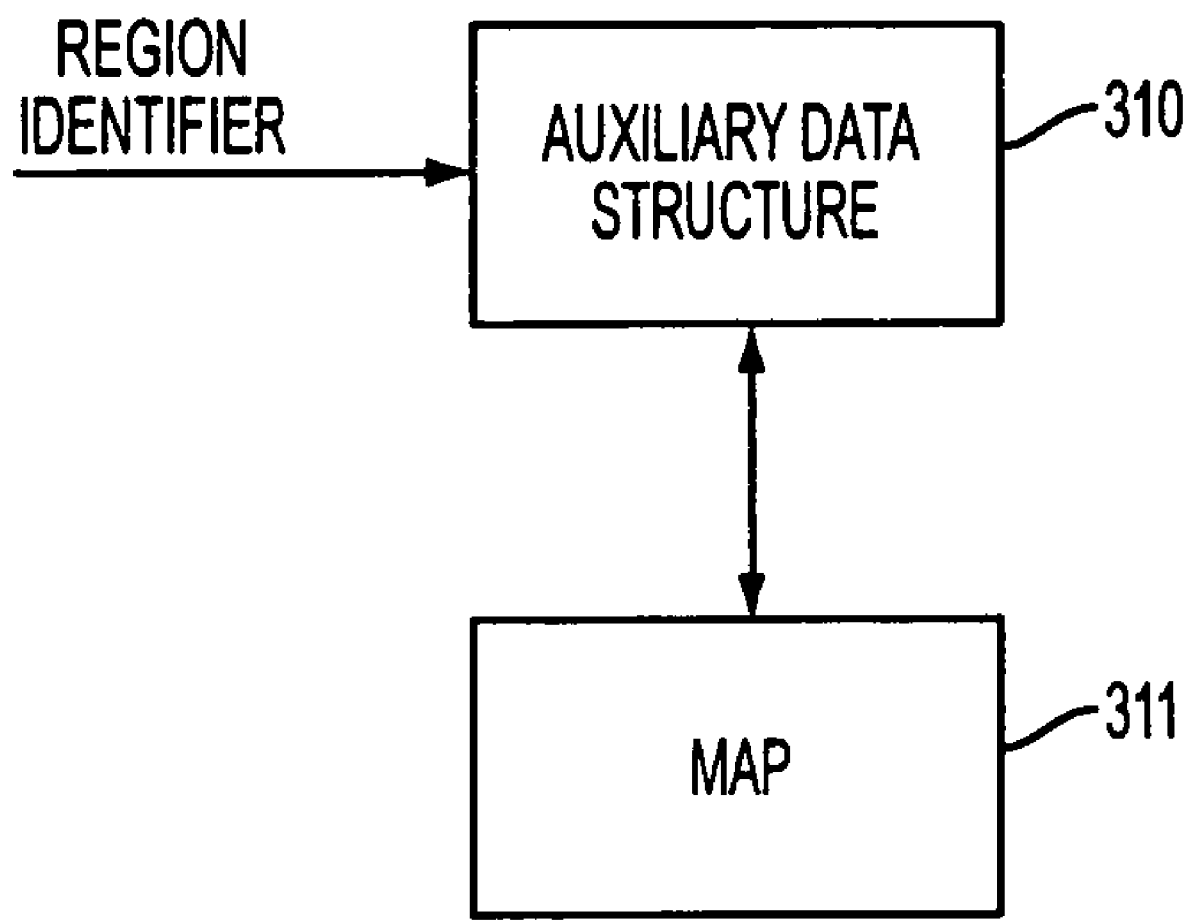
FIG. 3A depicts a conceptual block diagram of a mapping scheme that may be used in some embodiments of the invention.

FIG. 3A shows a conceptual block diagram of this use of an auxiliary data structure and mapping, according to some embodiments of the invention. As shown, a region identifier may be mapped, using an auxiliary data structure 310, to some type of map 311, which may be used to represent the possible page sizes that may be associated with the region identifier. This may be used to limit VHPT hash searching to only page sizes associated with the particular region identifier, rather than having to search all implemented page sizes. In an exemplary implementation of such an embodiment of the invention, auxiliary data structure 310 may be implemented as a hash table, and map 311 may be a simple bit-mapping table. That is, the entries of map 311 may have a bit to represent each possible page size for the system, and for an entry associated with a given region identifier, each bit of the entry may represent whether the particular page size is or is not associated with that region identifier.

Figure 4:
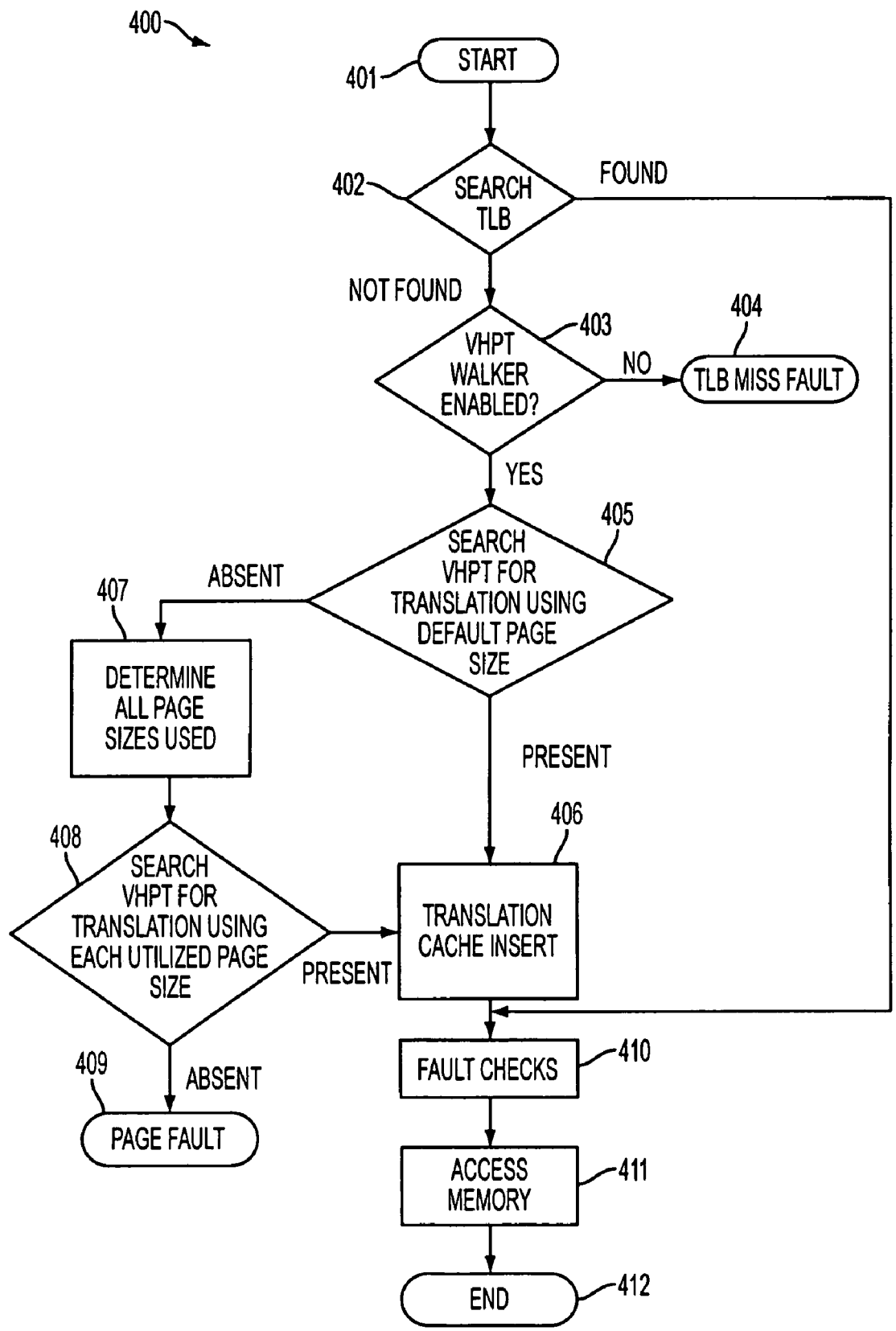
FIG. 4 depicts an exemplary embodiment of a method for translation searching.

FIG. 4 depicts an exemplary flow diagram 400 that illustrates an exemplary method for translation searching within the VHPT using an auxiliary data structure according to an exemplary embodiment of the invention. The method illustrated in flow diagram 400 may start with block 401. In block 402, the TLB may be searched. In an exemplary embodiment of the invention, the TLB may be searched using a region number and/or identifier of a faulting virtual address. In such an embodiment, this region number may be found, for example, in the upper 3-bits of the faulting virtual address. If a translation is found, fault checks may be performed in block 410, and memory may be accessed using the translation in block 411. The method may end at block 412.

If no translation is found while searching the TLB in block 402, a determination may be made in block 403 as to whether a VHPT walker is enabled. If a VHPT walker is not enabled, a TLB miss fault may occur in block 404. If a VHPT walker is enabled in block 403, the VHPT may be searched in block 405, for example, using the default page size that is associated with the region ID. In an exemplary embodiment of the invention, a hardware-driven hashing function, for example, may use the region number and/or identifier and the default page size to search the VHPT in block 405. If a translation is located while searching the VHPT in block 403, the translation may be inserted into a translation cache, for example, in block 406.

In an exemplary embodiment of the invention, if a translation is not located while searching the VHPT in block 403 using the default page size that is associated with the region number, an auxiliary data structure, for example, may be used to determine all page sizes that have been used within the associated region number in block 407. In such an embodiment, when a page size that is different from the default page size is used within a given region, the utilized page size may be recorded in an auxiliary data structure, as discussed above.

Once the page sizes that are used within the given region are determined in block 407, the VHPT may be searched in block 408 for a translation. When the VHPT is searched in block 408, a software-driven hashing function or a software-driven, hardware-assisted hashing function, for example, may use the region number and/or identifier and the utilized page size to search the VHPT in block 408, for each utilized page size, for example. In some embodiments of the invention, block 408 may determine that a translation has been found based on matching both: (1) utilized page size; and (2) the region number and identifier (e.g., the RID and the VPN), or some predetermined function thereof. In an exemplary embodiment of the invention, if the operating system, for example, is able to determine that a certain utilized page size is more heavily used than another utilized page size, the operating system, for example, may be able to search the more likely page size first.

If a translation is located while searching the VHPT in block 408, the translation may be inserted into a translation cache, for example, in block 406. If a translation is not located while searching the VHPT in block 408, a page fault may occur in block 409.

In an exemplary embodiment of the invention, once a translation has been inserted into the translation cache in block 406, for example, fault checks may be performed in block 410, and memory may be accessed using the translation in block 411. The method may end at block 412.

It is noted that some embodiments of the invention may use a single-entry algorithm to store and/or find mapping entries (e.g., VHPT entries). This may be used even where a page size that is larger than the default page size is used. It is noted that both storage and search functions (i.e., finding) associated with such mapping entries may use a common predetermined algorithm for determining memory location. Many such algorithms may be used, and it may be left to the system designer to decide on a particular algorithm.

Figure 5:
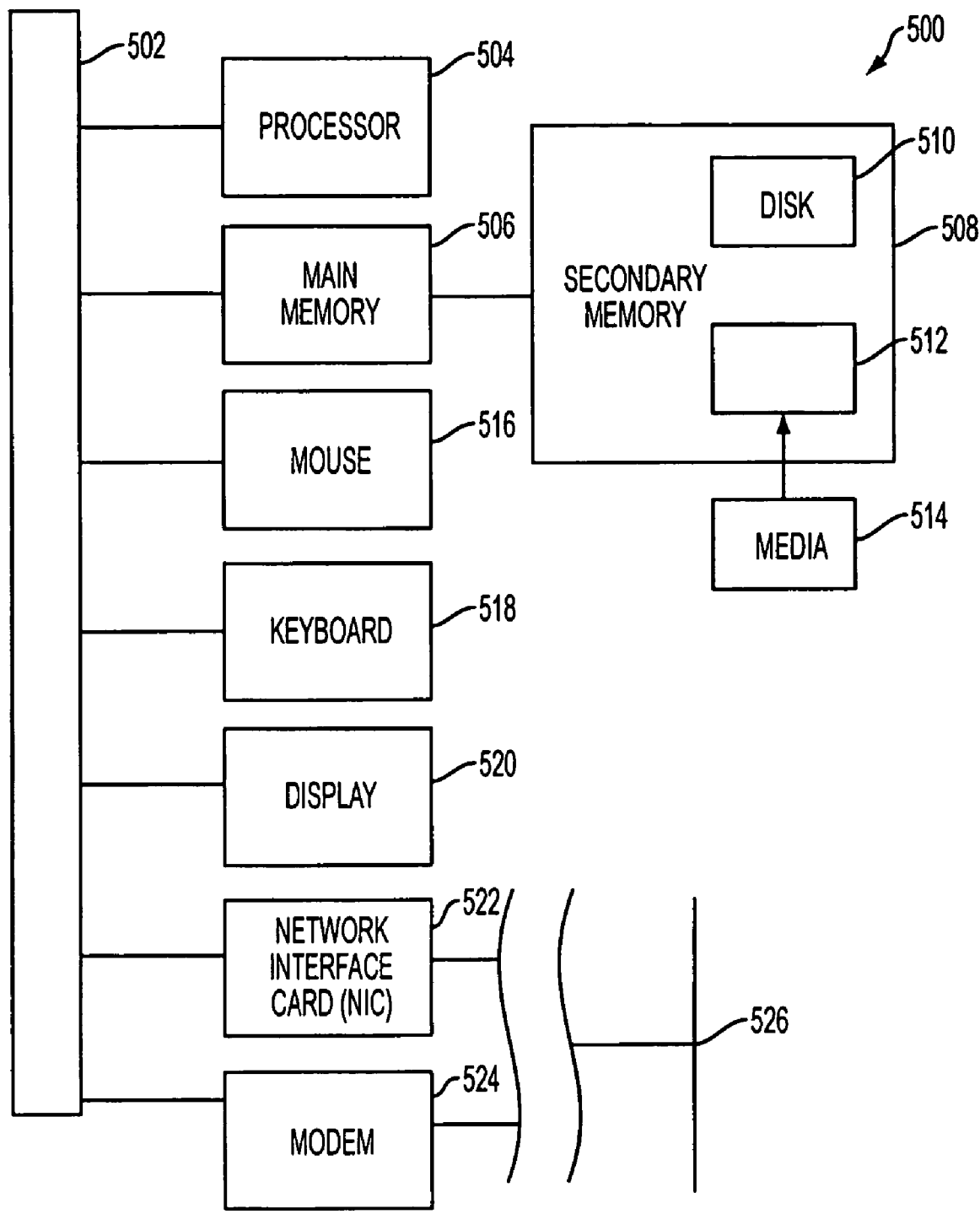
FIG. 5 depicts an exemplary embodiment of a computer and/or communications system as can be used for several components in an embodiment of the invention.

FIG. 5 depicts an exemplary embodiment of a computer and/or communications system as may be used to incorporate several components of the system in an exemplary embodiment of the present invention. FIG. 5 depicts an exemplary embodiment of a computer 500 as may be used for several computing devices in exemplary embodiments of the present invention. Computer 500 may include, but is not limited to: e.g., any computer device, or communications device including, e.g., a personal computer (PC), a workstation, a mobile device, a phone, a handheld PC, a personal digital assistant (PDA), a thin client, a fat client, a network appliance, an Internet browser, a paging, or alert device, a television, an interactive television, a receiver, a tuner, a high definition (HD) television, an HD receiver, a video-on-demand (VOD) system, a server, or other device.

Computer 500, in an exemplary embodiment, may comprise a central processing unit (CPU) or processor 504, which may be coupled to a bus 502. Processor 504 may, e.g., access main memory 506 via bus 502. CPU or processor 504 may also include storage, such as, but not limited to, RAM, ROM, cache memory, etc. The VHPT, TLB, and other components discussed above may be implemented in storage located on the CPU or processor 504 and/or in main memory 506 and/or in secondary memory 508 (discussed below). Computer 500 may be coupled to an Input/Output (I/O) subsystem such as, e.g., a network interface card (NIC) 522, or a modem 524 for access to network 526. Computer 500 may also be coupled to a secondary memory 508 directly via bus 502, or via main memory 506, for example. Secondary memory 508 may include, e.g., a disk storage unit 510 or other storage medium. Exemplary disk storage units 510 may include, but are not limited to, a magnetic storage device such as, e.g., a hard disk, an optical storage device such as, e.g., a write once read many (WORM) drive, or a compact disc (CD), or a magneto optical device. Another type of secondary memory 508 may include a removable disk storage device 512, which can be used in conjunction with a removable storage medium 514, such as, e.g. a CD-ROM, or a floppy diskette. In general, the disk storage unit 510 may store an application program for operating the computer system referred to commonly as an operating system. The disk storage unit 510 may also store documents of a database (not shown). The computer 500 may interact with the I/O subsystems and disk storage unit 510 via bus 502. Hence, the computer 500 may have access to numerous types of machine-accessible media, which may include, but are not limited to, storage found in CPU or processor 504, main memory 506, secondary memory 508 (and possible associated media 514). The bus 502 may also be coupled to a display 520 for output, and input devices such as, but not limited to, a keyboard 518 and a mouse or other pointing/selection device 516.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method comprising:
    storing a default page size for a region register, the region register being identifiable by a region identifier stored within a virtual address, the virtual address comprising the region identifier and a virtual page number;
    storing at least one utilized page size corresponding to the region identifier in an auxiliary data structure wherein the auxiliary data structure contains a mapping of page sizes utilized in conjunction with the region identifier, wherein only utilized page sizes that are different from the default page size are stored in the auxiliary data structure;
    performing a first hashing algorithm using the region identifier, the virtual page number, and the default page size to locate a translation in a virtual hash page table (VHPT);
    performing a second hashing algorithm using the region identifier, the virtual page number, and the at least one utilized page size to locate a translation in the VHPT if a translation is not located during said performing of the first hashing algorithm; and
    inserting the located translation into a translation cache once a translation is located.

2. The method according to claim 1, wherein the first and second hashing algorithms include searching the VHPT to locate a translation.

3. The method according to claim 1, further comprising:
    performing an operation selected from the group consisting of: an instruction search and a data search of a translation lookaside buffer,
    wherein said performing of the first hashing algorithm and said performing of the second hashing algorithm occur after a failed instruction or data search of the translation lookaside buffer.

4. The method according to claim 1, wherein a VHPT walker performs the first and second hashing algorithms.

5. The method according to claim 1, wherein the VHPT comprises a long format VHPT.

6. The method according to claim 1, wherein the translation comprises a virtual address translation.

7. The method according to claim 1, further comprising:
    storing a single entry for mapping an entry in said VHPT.

8. The method according to claim 7, further comprising:
    utilizing a predetermined algorithm to identify a position of said single entry within said VHPT,
    wherein said performing a second hashing algorithm includes utilizing said predetermined algorithm.

9. The method according to claim 7, wherein said single entry is used for mapping even when a page size is used that is larger than said default page size.

10. A system comprising:
    a register associated with an region identifier stored within a virtual address, the virtual address comprising the region identifier and a virtual page number;
    a memory configured to store at least one utilized page size corresponding to the region identifier and a mapping of page sizes utilized in conjunction with the region identifier, wherein only utilized page sizes that are different from a default page size are stored in the auxiliary data structure;
    a virtual memory space configured to store a virtual hash page table (VHPT) to store virtual address translation entries;
    a translation cache being configured to store address translation entries;
    a processor configured to search the VHPT using the region identifier, the virtual page number, and the default page size to locate a virtual address translation in a virtual hash page table, to search the VHPT using the region identifier, the virtual page number, and the at least one utilized page size to locate a virtual address translation in the virtual hash page table if a translation is not located during a first hashing algorithm, and to insert an address translation into the translation cache.

11. The system according to claim 10, wherein the VHPT comprises a single large hash page table.

12. The system according to claim 11, wherein the VHPT comprises 32-byte long format entries.

13. The system according to claim 10, wherein the register is a region register.

14. The system according to claim 13, wherein the identifier is a region identifier.

15. The system according to claim 10, wherein the processor comprises a VHPT walker to search the VHPT for a virtual address translation.

16. The system according to claim 15, further comprising a translation lookaside buffer to store virtual address translation entries, and
    wherein the VHPT walker searches the VHPT for a virtual address translation after a failed instruction or a failed data search of the translation lookaside buffer.

17. The system according to claim 10, wherein said processor includes at least one component selected from the group consisting of: said register; said memory; said virtual memory space; and said translation cache.

18. A machine-accessible medium containing program instructions that, when executed by a processor, cause the processor to perform operation comprising:

storing a default page size for a region register, the region register being identifiable by a region identifier stored within a virtual address, the virtual address comprising the region identifier and a virtual page number;

storing at least one utilized page size corresponding to the region identifier in an auxiliary data structure wherein the auxiliary data structure contains a mapping of page sizes utilized in conjunction with the region identifier, wherein only utilized page sizes that are different from the default page size are stored in the auxiliary data structure;

searching a virtual hash page table (VHPT) using the region identifier and the virtual page number of the virtual address, and the default page size corresponding to the region identifier to locate a virtual address translation in the VHPT;

searching the VHPT using the region identifier, the virtual page number, and the at least one utilized page size to locate a virtual address translation in the VHPT if a virtual address translation is not located during said search of the VHPT using the region identifier, the virtual page number, and the default page size; and inserting the located virtual address translation into a translation cache once a virtual address translation is located.

19. The machine accessible medium according to claim 18, wherein each said searching comprises a VHPT walker to search the VHPT for a virtual address translation.

20. The machine accessible medium according to claim 19, wherein each said searching comprises the VHPT walker searching the VHPT for a virtual address translation after a failed instruction or a failed data search of a translation lookaside buffer.

21. The machine accessible medium according to claim 18, wherein each said searching is based on use of a single-entry algorithm for mapping entries in said VHPT.

22. The machine accessible medium according to claim 21, wherein said single-entry algorithm is used for mapping even when a page size is used that is larger than said default page size.

* * * * *